United States Patent
Mohanram et al.

(10) Patent No.: US 11,321,073 B1
(45) Date of Patent: May 3, 2022

(54) UTILIZING MODELS FOR REPLACING EXISTING ENTERPRISE SOFTWARE WITH NEW ENTERPRISE SOFTWARE

(71) Applicant: Accenture Global Solutions Limited, Dublin (IE)

(72) Inventors: Jayanthi Mohanram, Bangalore (IN); Prateek Shah, Birmingham (GB); Mani Gupta, Fursungi (IN); Abhishek Sharma, Patparganj (IN); Varsha Ajit Shrikhande, Mumbai (IN); Palaniappan Ganesh Kumar, Chennai (IN); Arun Srinivasan, Chennai (IN); Vivek Shyamlal Sharma, Bangalore (IN); Amol Deshpande, Pune (IN); Prasanna Kulkarni, Thane West (IN); Anil Vohra, Chinsurah-Mogra (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/122,591

(22) Filed: Dec. 15, 2020

(51) Int. Cl.
*G06F 9/44* (2018.01)
*G06F 8/65* (2018.01)
*G06N 5/04* (2006.01)

(52) U.S. Cl.
CPC .............. *G06F 8/65* (2013.01); *G06N 5/047* (2013.01)

(58) Field of Classification Search
CPC .................................. G06F 8/65; G06N 5/047
USPC .................................................. 717/100–105
See application file for complete search history.

(56) References Cited

U.S. PATENT DOCUMENTS

2017/0109657 A1\* 4/2017 Marcu .................. G06Q 10/067

\* cited by examiner

*Primary Examiner* — Chuck O Kendall
(74) *Attorney, Agent, or Firm* — Harrity & Harrity, LLP

(57) ABSTRACT

A device may receive source data identifying source enterprise software and may process the source data to determine field mapping data. The device may process the source data, with a first model, to determine implementation guide data identifying implementation guides, and the device may convert data configurations from the source data to target data configurations. The device may generate transport request management data for the target enterprise software based on the source data and the implementation guide data and may process the source data and the implementation guide data, with a second model, to determine copy functionality data identifying functionality of the source enterprise software to be copied. The device may process the source data, with a third model, to determine consolidation data identifying the source data to be consolidated and may configure the target enterprise software, based on the determined data, to generate configured target enterprise software.

20 Claims, 10 Drawing Sheets

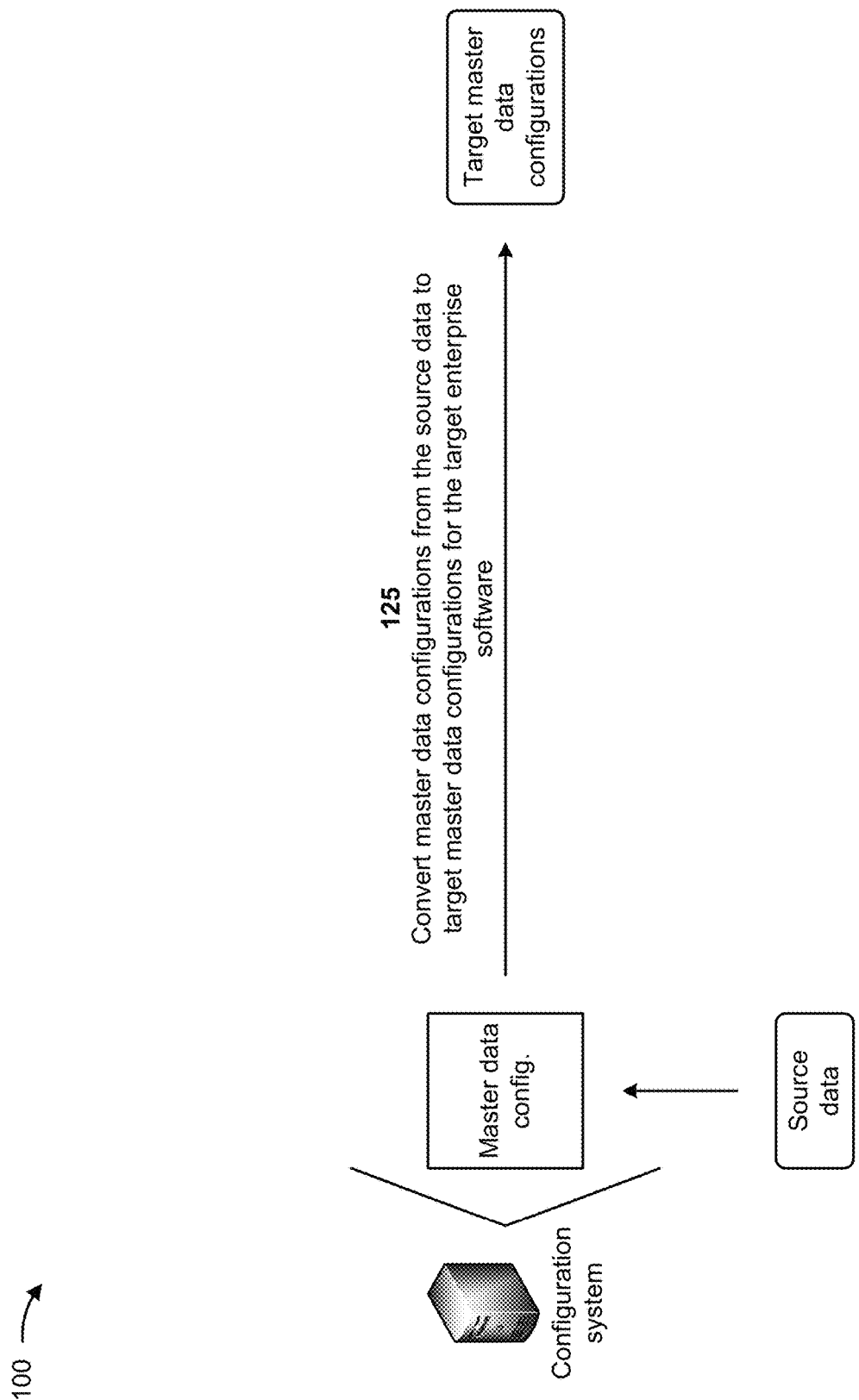

UTILIZING MODELS FOR REPLACING EXISTING ENTERPRISE SOFTWARE WITH NEW ENTERPRISE SOFTWARE

BACKGROUND

Enterprise software (e.g., enterprise resource planning (ERP) software) is computer software used to satisfy needs of an organization rather than individual users. Such organizations may include businesses, schools, interest-based user groups, clubs, charities, and governments. Enterprise software is an integral part of a computer-based information system, and a collection of such software is called an enterprise system.

SUMMARY

In some implementations, a method may include receiving source data identifying source enterprise software to be converted to target enterprise software, and processing the source data to determine field mapping data that maps fields of the source enterprise software to fields of the target enterprise software. The method may include processing the source data, with an implementation guide handling model, to determine implementation guide data identifying implementation guides and a ranking of the implementation guides for configuring the target enterprise software, and converting data configurations from the source data to target data configurations for the target enterprise software. The method may include generating transport request management data for the target enterprise software based on the source data and the implementation guide data, and processing the source data and the implementation guide data, with a pattern recognition model, to determine copy functionality data identifying functionality of the source enterprise software to be copied. The method may include processing the source data, with a k-nearest neighbor model, to determine consolidation data identifying the source data to be consolidated in the target enterprise software, and configuring the target enterprise software, based on the field mapping data, the implementation guide data, the target data configurations, the transport request management data, the copy functionality data, and the consolidation data, to generate configured target enterprise software.

In some implementations, a device includes one or more memories, and one or more processors to receive source data identifying source enterprise software to be converted to target enterprise software, and determine a scope of a conversion from the source enterprise software to the target enterprise software. The one or more processors may process the source data, based on the scope, to determine field mapping data that maps fields of the source enterprise software to fields of the target enterprise software, and may process the source data, with an implementation guide handling model, to determine implementation guide data identifying implementation guides and a ranking of the implementation guides for configuring the target enterprise software. The one or more processors may convert data configurations from the source data to target data configurations for the target enterprise software, and may generate transport request management data for the target enterprise software based on the source data and the implementation guide data. The one or more processors may process the source data and the implementation guide data, with a pattern recognition model, to determine copy functionality data identifying functionality of the source enterprise software to be copied, and may process the source data, with a k-nearest neighbor model, to determine consolidation data identifying the source data to be consolidated in the target enterprise software. The one or more processors may configure the target enterprise software, based on the field mapping data, the implementation guide data, the target data configurations, the transport request management data, the copy functionality data, and the consolidation data, to generate configured target enterprise software.

In some implementations, a non-transitory computer-readable medium may store a set of instructions that includes one or more instructions that, when executed by one or more processors of a device, cause the device to receive source data identifying source enterprise software to be converted to target enterprise software, and process the source data to determine field mapping data that maps fields of the source enterprise software to fields of the target enterprise software. The one or more instructions may cause the device to process the source data, with an implementation guide handling model, to determine implementation guide data identifying implementation guides and a ranking of the implementation guides for configuring the target enterprise software, and convert data configurations from the source data to target data configurations for the target enterprise software. The one or more instructions may cause the device to generate transport request management data for the target enterprise software based on the source data and the implementation guide data, and process the source data and the implementation guide data, with a pattern recognition model, to determine copy functionality data identifying functionality of the source enterprise software to be copied. The one or more instructions may cause the device to process the source data, with a k-nearest neighbor model, to determine consolidation data identifying the source data to be consolidated in the target enterprise software, and configure the target enterprise software, based on the field mapping data, the implementation guide data, the target data configurations, the transport request management data, the copy functionality data, and the consolidation data, to generate configured target enterprise software. The one or more instructions may cause the device to cause the configured target enterprise software to be implemented in an enterprise system.

BRIEF DESCRIPTION OF THE DRAWINGS

FIGS. 1A-1G are diagrams of an example implementation described herein.

DETAILED DESCRIPTION

Figure 1A:
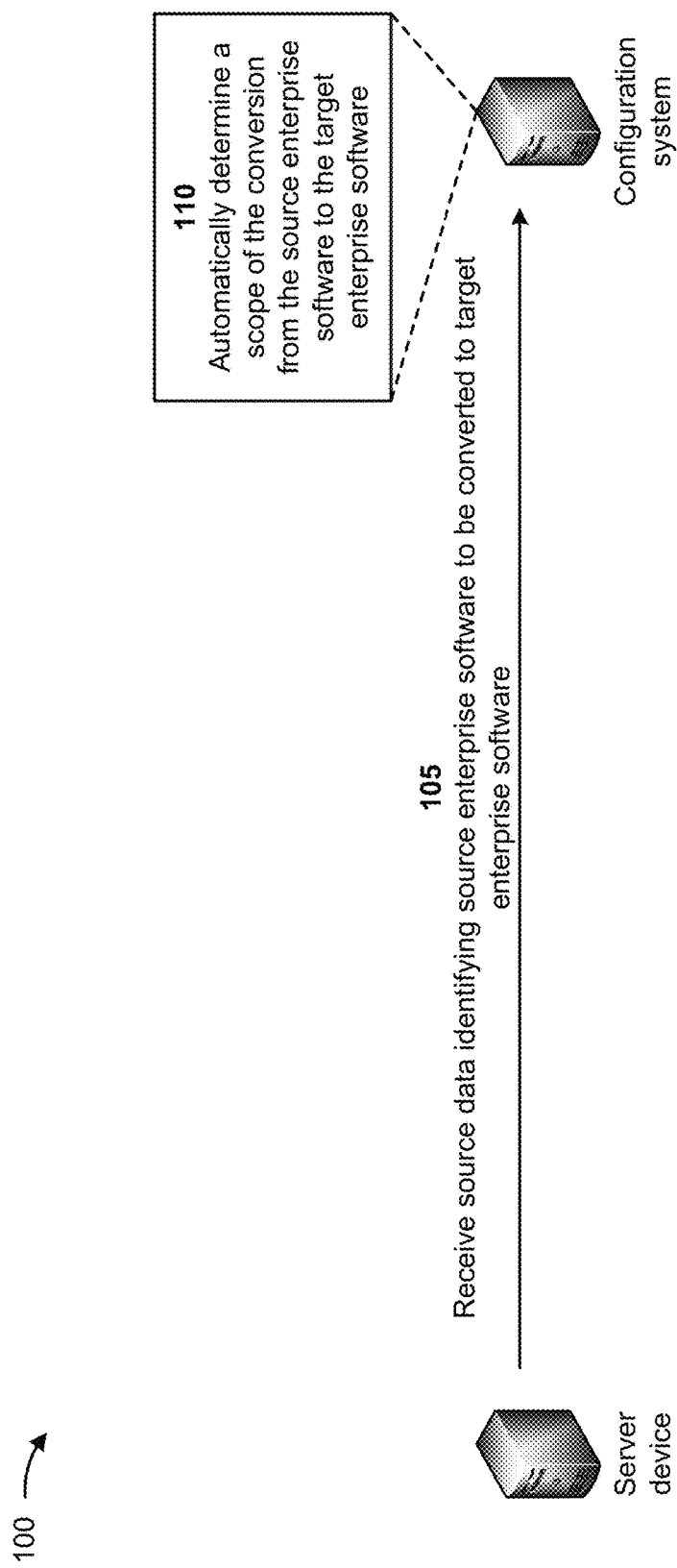

The following detailed description of example implementations refers to the accompanying drawings. The same reference numbers in different drawings may identify the same or similar elements.

Services provided by enterprise software are typically business-oriented tools, such as online shopping, online payment processing, interactive product catalogs, automated billing systems, security, business process management, enterprise content management, information technology service management, customer relationship management, enterprise resource planning, business intelligence, project management, collaboration, human resource management, manufacturing, occupational health and safety, enterprise application integration, enterprise forms automation, and/or the like. Replacing existing enterprise software with new enterprise software requires a configuration build that is time consuming and requires multiple computing resources. For example, functional configurations of the existing enterprise software need to be duplicated across systems manually, which requires significant computing and networking resources and increases deployment time. Thus, current methods for replacing existing enterprise software with new enterprise software waste computing resources (e.g., processing resources, memory resources, communication resources, and/or the like), networking resources, human resources, and/or the like associated with configuring the new enterprise software, identifying configurations of the existing enterprise software, incorrectly configuring the new enterprise software, and/or the like.

Some implementations described herein relate to a configuration system that utilizes models for replacing existing enterprise software with new enterprise software. For example, the configuration system may receive source data identifying source enterprise software to be converted to target enterprise software, and the configuration system may process the source data to determine field mapping data that maps fields of the source enterprise software to fields of the target enterprise software. The configuration system may process the source data, with an implementation guide handling model, to determine implementation guide data identifying implementation guides and a ranking of the implementation guides for configuring the target enterprise software, and the configuration system may convert data configurations from the source data to target data configurations for the target enterprise software. The configuration system may generate transport request management data for the target enterprise software based on the source data and the implementation guide data and may process the source data and the implementation guide data, with a pattern recognition model, to determine copy functionality data identifying functionality of the source enterprise software to be copied. The configuration system may process the source data, with a k-nearest neighbor model, to determine consolidation data identifying the source data to be consolidated in the target enterprise software, and may configure the target enterprise software, based on the field mapping data, the implementation guide data, the target data configurations, the transport request management data, the copy functionality data, and the consolidation data, to generate configured target enterprise software.

In this way, the configuration system may utilize models for replacing existing enterprise software with new enterprise software. For example, the configuration system may be utilized during a build phase of new enterprise software to perform functional configuration for multiple use cases of the new enterprise software. The configuration system may be scalable to onboard new enterprise software for different industries and functional modules depending upon requirements of the new enterprise software. Thus, the configuration system conserves computing resources, networking resources, human resources, and/or the like that would otherwise have been wasted by configuring the new enterprise software, identifying configurations of the existing enterprise software, incorrectly configuring the new enterprise software, and/or the like.

FIGS. 1A-1G are diagrams of an example implementation 100 described herein. Example implementation 100 may be associated with utilizing models for replacing existing enterprise software with new enterprise software. As shown in FIGS. 1A-1G, example implementation 100 includes a client device associated with a configuration system. The client device may include a laptop computer, a mobile telephone, a desktop computer, and/or the like utilized by the user. The configuration system may include a system that utilizes models for replacing existing enterprise software with new enterprise software.

As shown in FIG. 1A, and by reference number 105, the configuration system receives source data identifying source enterprise software to be converted to target enterprise software. The source enterprise software and/or the target enterprise software may include enterprise resource planning software, business intelligence software, enterprise content management software, information technology service management software, customer relationship management software, treasury management system software, supply chain management software, and/or the like.

Additionally, the source data may include configuration data associated with the source enterprise software and/or the target enterprise software. The configuration data may include information identifying settings, parameters, types of data, data fields, functional modules, services, business units, and/or the like of the source enterprise software and/or the target enterprise software.

As shown by reference number 110, the configuration system determines a scope of the conversion from the source enterprise software to the target enterprise software. For example, the configuration system may determine one or more functional modules, one or more services, one or more business processes, and/or the like that are to be converted to the target enterprise software.

In some implementations, the configuration system determines the scope of the conversion based on user input. For example, a user (e.g., a project manager, a functional consultant, and/or the like) may input information identifying one or more functional modules, one or more services, one or more business processes, and/or the like that are to be converted to the target enterprise software via a user interface associated with the configuration system.

In some implementations, the configuration system may automatically determine the scope of the conversion. The configuration system may determine the scope of the conversion based on information input by a user (e.g., information identifying a particular industry, a geographical area, a particular client, and/or the like), implicit data (e.g., data gathered from available data streams during the configuration process), the configuration data associated with the source enterprise software and/or the target enterprise software, and/or the like.

In some implementations, the configuration system provides information identifying a recommended scope of the conversion to a user. The user may provide an input associated with modifying the recommended scope of the conversion (e.g., adding and/or removing a functional module, a service, a business process, and/or the like), accept the recommended scope of the conversion, reject the recommended scope of the conversion, and/or the like based on the recommended scope of the conversion being provided to the user.

Figure 1B:
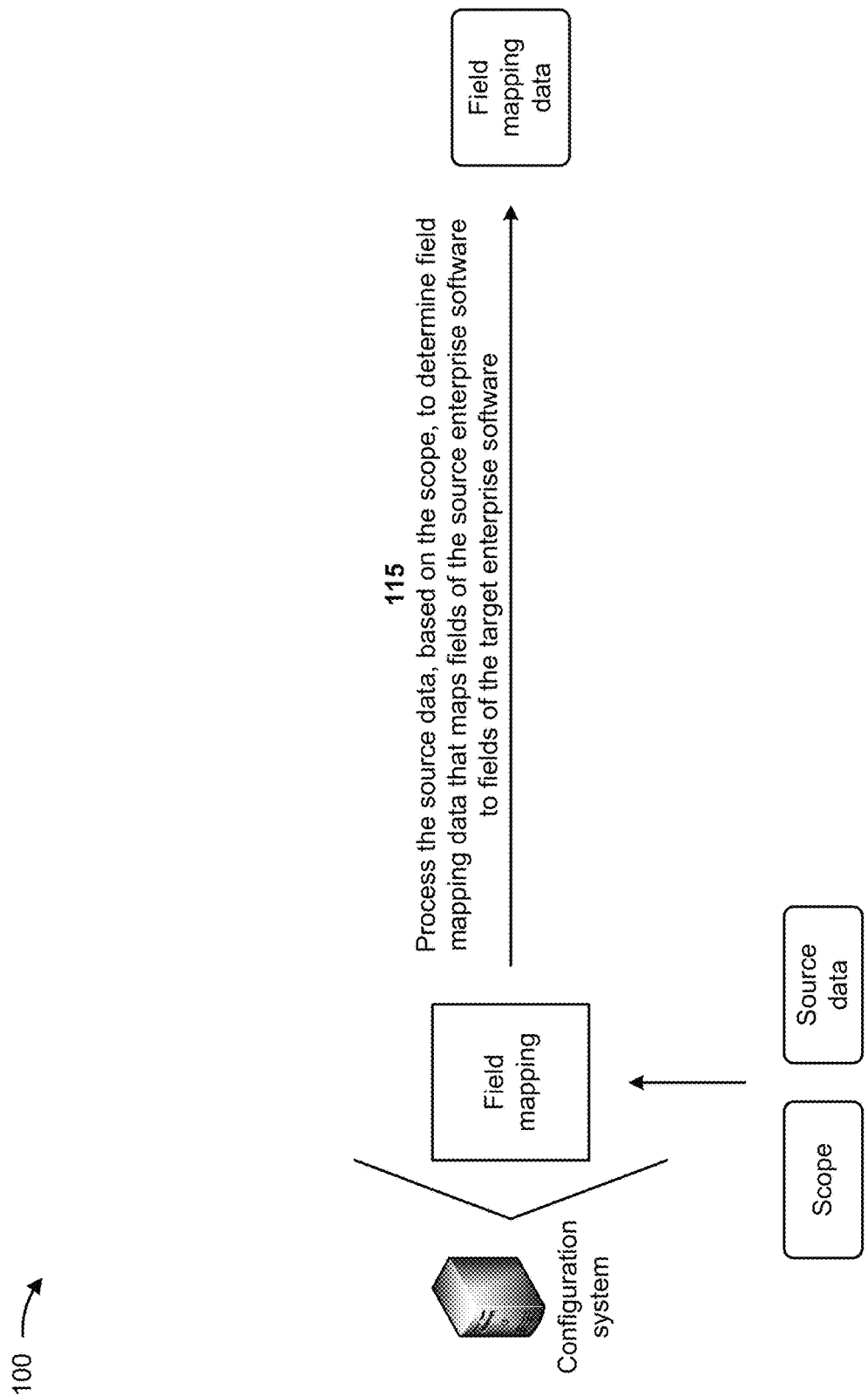

As shown in FIG. 1B, and by reference number 115, the configuration system processes the source data to determine field mapping data that maps fields of the source enterprise software to fields of the target enterprise software. The configuration system may process the source data to determine the source enterprise software and/or the target enterprise software. The configuration system may determine a first set of fields associated with the source enterprise software and/or a second set of fields associated with the target enterprise software based on determining the source enterprise software and/or the target enterprise software. The configuration system may determine the first set of fields and/or the second set of fields based on the source data, based on querying the source enterprise software and/or the target enterprise software, based on information stored in a data structure (e.g., a database, a table, a list, and/or the like), based on user input, and/or the like. The configuration system may determine the field mapping data based on accessing a data structure storing information mapping fields of the source enterprise software to fields of the target enterprise software.

In some implementations, the configuration system determines the field mapping based on the scope of the conversion. For example, the configuration system may identify a first group of fields included in the first set of fields and/or a second group of fields included in the second set of fields associated with a functional module, a service, and/or a business unit included in the scope of conversion. The configuration system may generate field mapping data mapping the first group of fields to the second group of fields based on accessing the data structure storing information mapping fields of the source enterprise software to fields of the target enterprise software.

Figure 1C:
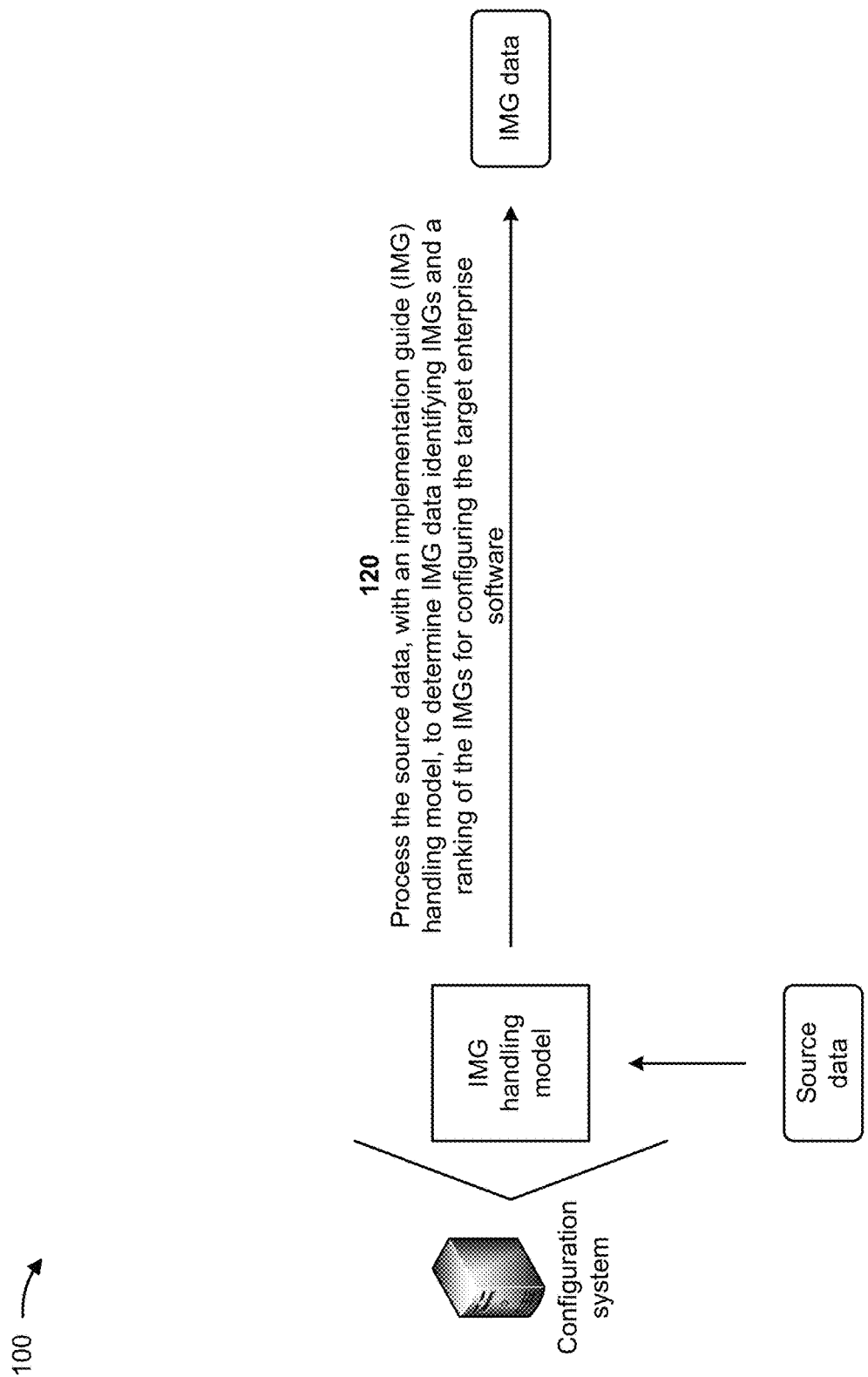

As shown in FIG. 1C, and by reference number 120, the configuration system processes the source data, with an implementation guide (IMG) handling model, to determine IMG data identifying IMGs and a ranking of the IMGs for configuring the target enterprise software. An IMG, of the IMGs identified in the IMG data, may be a tool that adjusts the target enterprise software to one or more requirements of an entity (e.g., a business, an organization, and/or the like for which the conversion is being performed). The IMG may comprise a hierarchical structure of application areas in a component hierarchy for a component of the target enterprise software. For example, the IMG may include a hierarchical structure of functionalities associated with customizing settings for a component of the target enterprise software.

The configuration system may process the source data, with a matrix factorization model, to determine the IMGs for configuring the target enterprise software. The matrix factorization model may include a singular value decomposition model, a principal component analysis model, a probabilistic matrix factorization model, and/or the like. In some implementations, the configuration system may train the matrix factorization model to determine IMGs associated with converting the source enterprise software to the target enterprise software. The matrix factorization model may be trained based on historical data relating to converting the source enterprise software to the target enterprise software and historical data relating to IMGs with which those conversions are associated. The matrix factorization model may be trained to determine, based on source data associated with a conversion, IMGs associated with converting the source enterprise software to the target enterprise software and a confidence score that reflects a measure of confidence that the IMGs are accurate for this conversion. In some implementations, the configuration system obtains a trained matrix factorization model from another device.

The configuration system may provide the source data to the matrix factorization model as an input. The matrix factorization model may process the source data to generate an output identifying IMGs associated with converting the source enterprise software to the target enterprise software. For example, the matrix factorization model may generate an output identifying an IMG based on determining a relationship between a business process identified in the source data and the IMG.

The configuration system may map the IMGs into mathematical representations. The configuration system may process the mathematical representations, with a similarity function model, to determine a relevance of the IMGs. The configuration system may determine the IMGs based on the relevance of the IMGs associated with converting the source enterprise software to the target enterprise software.

In some implementations, the configuration system ranks the IMGs. The ranking may represent an order in which the IMGs are to be configured. For example, an IMG ranked first is to be configured prior to an IMG ranked second.

As shown in FIG. 1D, and by reference number 125, the configuration system converts data configurations from the source data to target data configurations for the target enterprise software. The target data configurations may include data associated with a general ledger accounting component of the target enterprise software, an asset accounting component of the target enterprise software, an accounts payable component of the target enterprise software, and/or a material ledger component of the target enterprise software. The configuration system may convert the data configurations from the source data to the target data configurations for the target enterprise software based on a template associated with converting the source enterprise software to the target enterprise software. The template may include a plurality of fields associated with data configurations of the source enterprise software and/or the target enterprise software. The configuration system may input the data configurations into the plurality of fields and may provide the template for display to a user to enable the user to review the template, modify one or more of the plurality of fields, and/or the like.

Figure 1E:
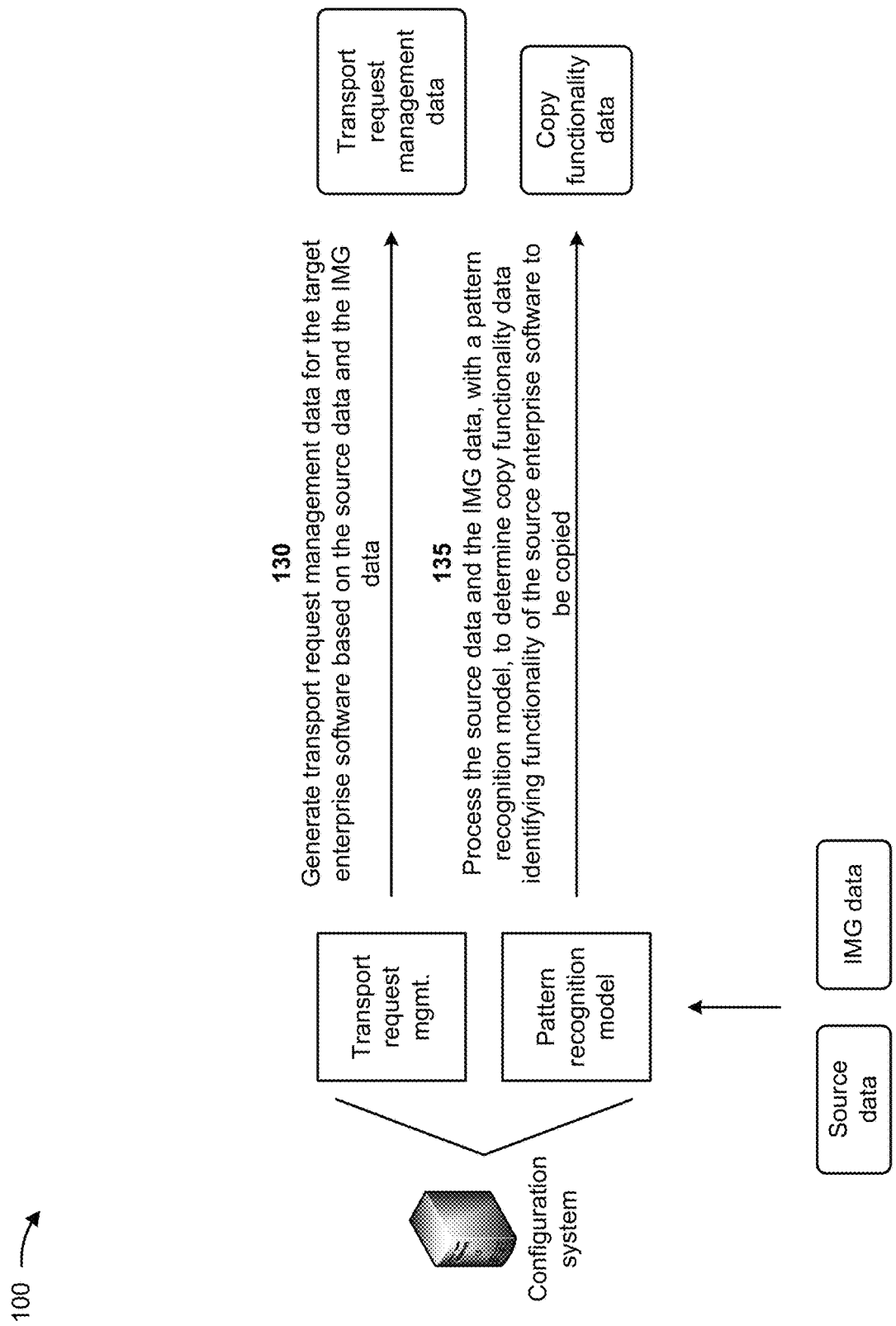

As shown in FIG. 1E, and by reference number 130, the configuration system generates transport request management data for the target enterprise software based on the source data and the IMG data. The transport request management data may include information identifying one or more transport requests. A transport request may be a request utilized by the configuration system to transfer data from the source enterprise software to the target enterprise software. The configuration system may identify first transport requests associated with a first portion of the IMGs of the IMG data. The configuration system may create second transport requests for a second portion of the IMGs of the IMG data. The transport request management data may include the first transport requests and the second transport requests.

As shown by reference number 135, the configuration system processes the source data and the IMG data, with a pattern recognition model, to determine copy functionality data identifying functionality of the source enterprise software to be copied. The configuration system may identify patterns indicating that a particular IMG, for which reference data is created, is related to one or more of the IMGs. The configuration system may automatically populate templates for the one or more IMGs with the reference data associated with the particular IMG. The reference data may correspond to the copy functionality data.

Figure 1F:
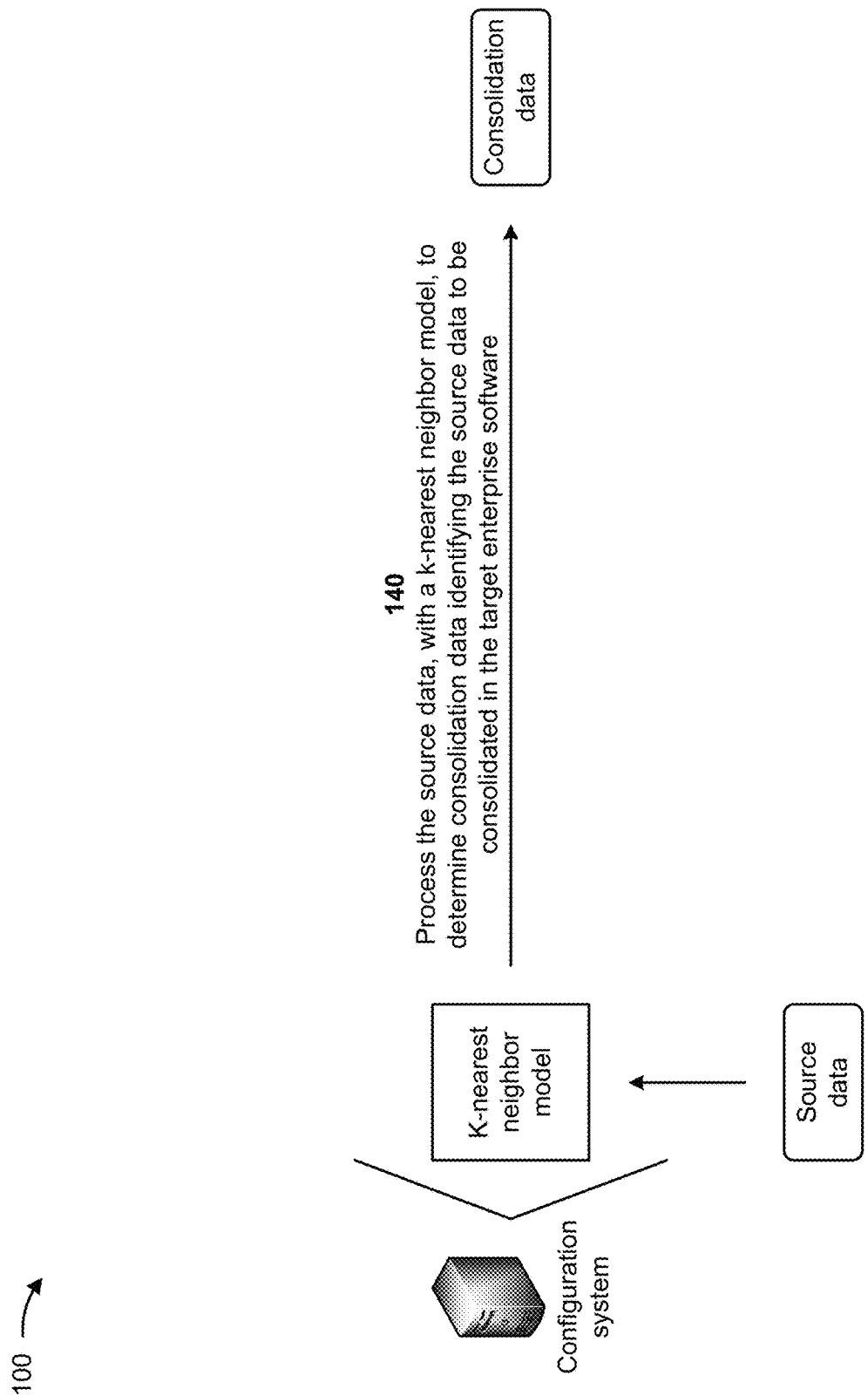

As shown in FIG. 1F, and by reference number 140, the configuration system processes the source data, with a k-nearest neighbor model, to determine consolidation data identifying the source data to be consolidated in the target enterprise software. The configuration system may compare the source data to identify redundant configurations from the source data. The configuration system may remove the redundant configurations from the source data to generate the consolidated data.

Figure 1G:
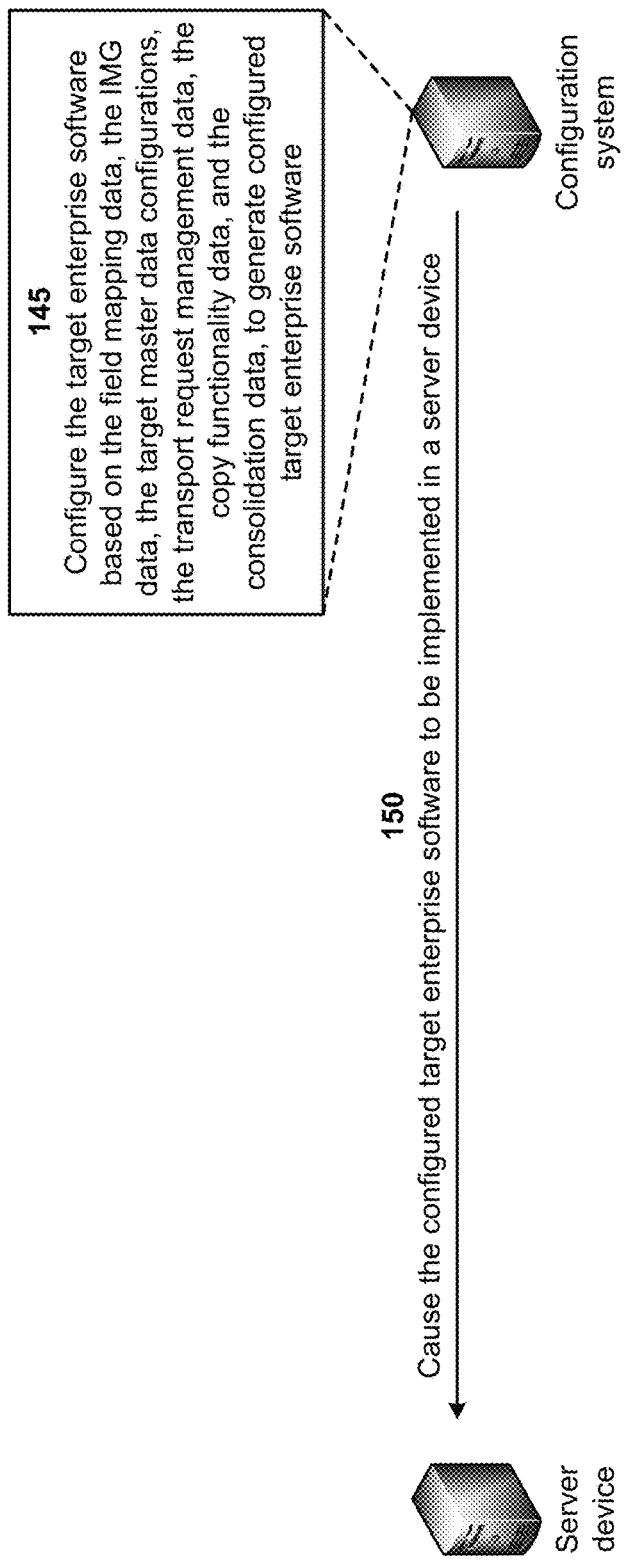

As shown in FIG. 1G, and by reference number 145, the configuration system configures the target enterprise software, based on the field mapping data, the IMG data, the target data configurations, the transport request management data, the copy functionality data, and the consolidation data, to generate configured target enterprise software. The configuration system may create filled templates based on the field mapping data, the IMG data, the target data configurations, the transport request management data, the copy functionality data, and the consolidation data. The configuration system may execute the filled templates to generate the configured target enterprise software.

As shown by reference number 150, the configuration system causes the configured target enterprise software to be implemented in an enterprise system. In some implementations, the configuration system generates log files based on configuring the target enterprise software and determines whether configuration of the target enterprise software failed or succeeded based on the log files. The configuration system may cause the configured target enterprise software to be implemented in the enterprise system when the configuration of the target enterprise software succeeded.

The configuration system may update one or more of the field mapping data, the IMG data, the target data configurations, the transport request management data, the copy functionality data, and/or the consolidation data when the configuration of the target enterprise software failed. For example, the configuration system may provide the log files to a user. The user may review the log files and may provide information for updating the field mapping data, the IMG data, the target data configuration, the transport request management data, the copy functionality data, and/or the consolidation data. The configuration system may update the field mapping data, the IMG data, the target data configurations, the transport request management data, the copy functionality data, and/or the consolidation data based on the provided information.

In this way, the configuration system may utilize models for replacing existing enterprise software with new enterprise software. For example, the configuration system may be utilized during a build phase of new enterprise software to perform functional configuration for multiple use cases of the new enterprise software. The configuration system may be scalable to onboard new enterprise software for different industries and functional modules depending upon requirements of the new enterprise software. Thus, the configuration system conserves human resources, computing resources, networking resources, and/or the like that would otherwise have been wasted by configuring the new enterprise software, identifying configurations of the existing enterprise software, incorrectly configuring the new enterprise software, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
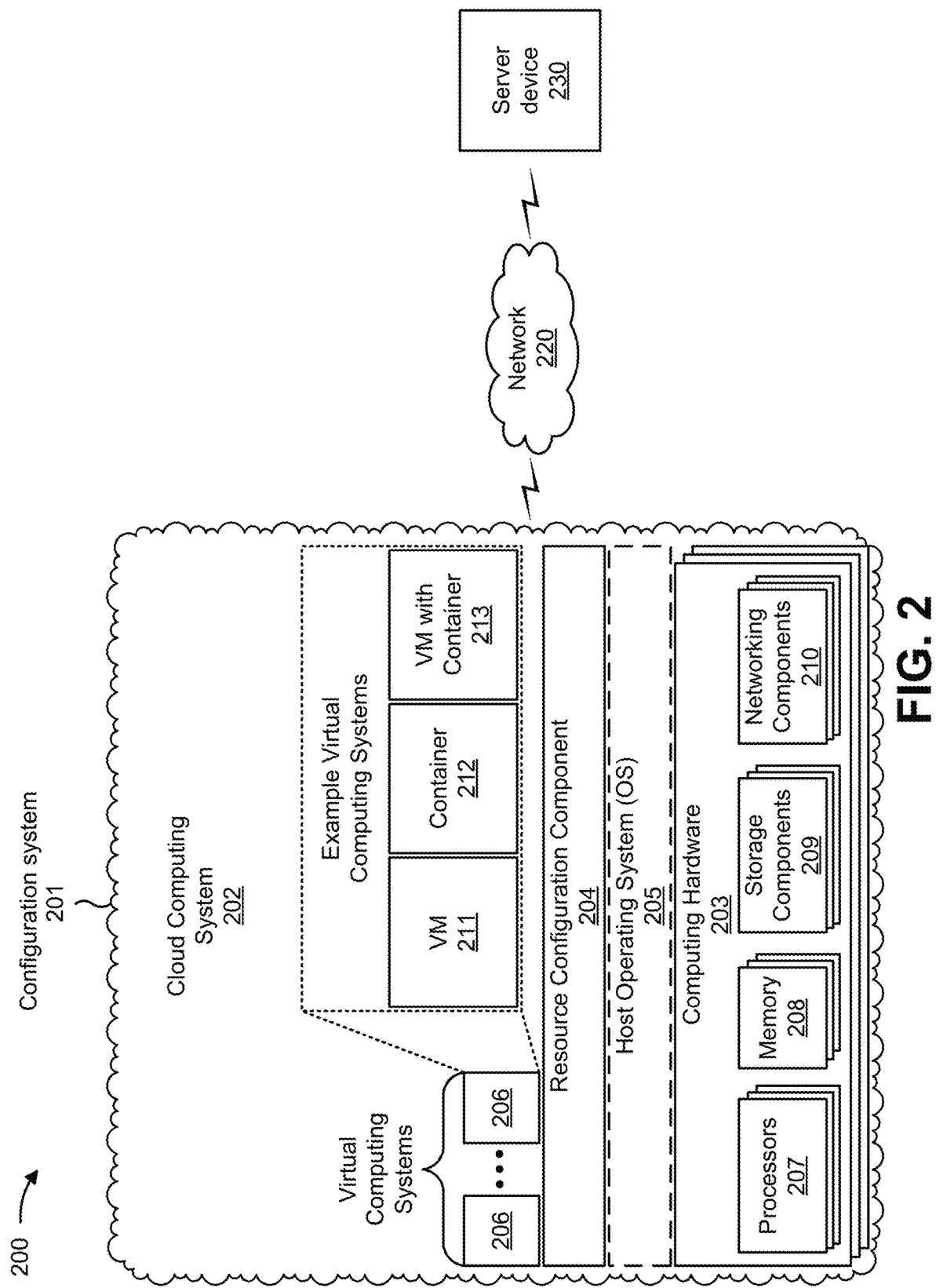
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a configuration system 201, which may include one or more elements of and/or may execute within a cloud computing system 202. The cloud computing system 202 may include one or more elements 203-213, as described in more detail below. As further shown in FIG. 2, environment 200 may include a network 220 and/or a server device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the configuration system 201 may include one or more elements 203-213 of the cloud computing system 202, may execute within the cloud computing system 202, and/or may be hosted within the cloud computing system 202, in some implementations, the configuration system 201 may not be cloud-based (e.g., may be implemented outside of a cloud computing system) or may be partially cloud-based. For example, the configuration system 201 may include one or more devices that are not part of the cloud computing system 202, such as device 300 of FIG. 3, which may include a standalone server or another type of computing device. The configuration system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200.

Server device 230 includes one or more devices capable of receiving, generating, storing, processing, providing, and/or routing information associated with enterprise software, as described elsewhere herein. Server device 230 may include a communication device and/or a computing device. For example, server device 230 may include a server, such as an application server, a client server, a web server, a database server, a host server, a proxy server, a virtual server (e.g., executing on computing hardware), or a server in a cloud computing system. In some implementations, server device 230 includes computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
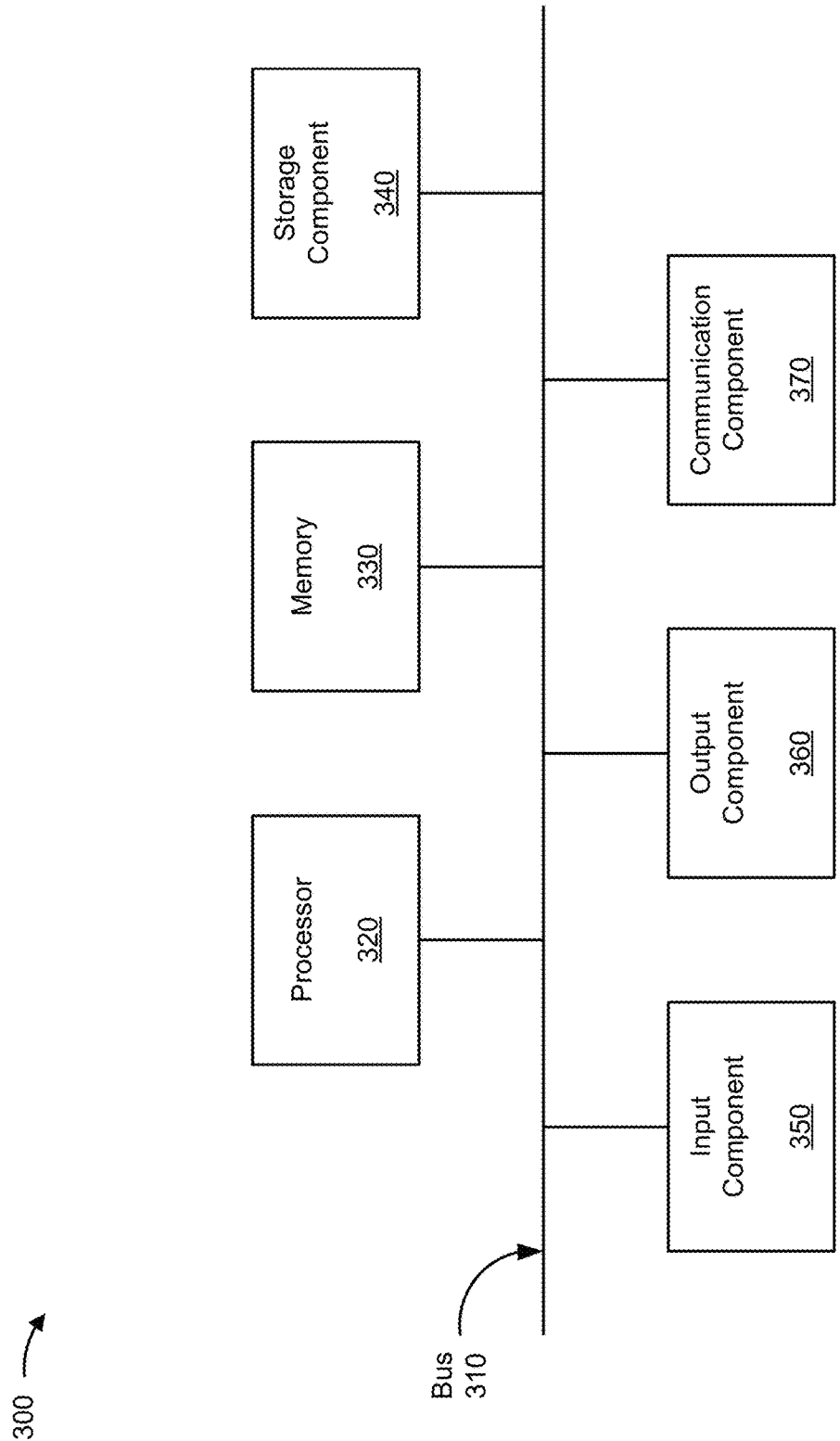
FIG. 3 is a diagram of example components of one or more devices of FIG. 2.

FIG. 3 is a diagram of example components of a device 300, which may correspond to configuration system 201 and/or server device 230. In some implementations, configuration system 201 and/or server device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
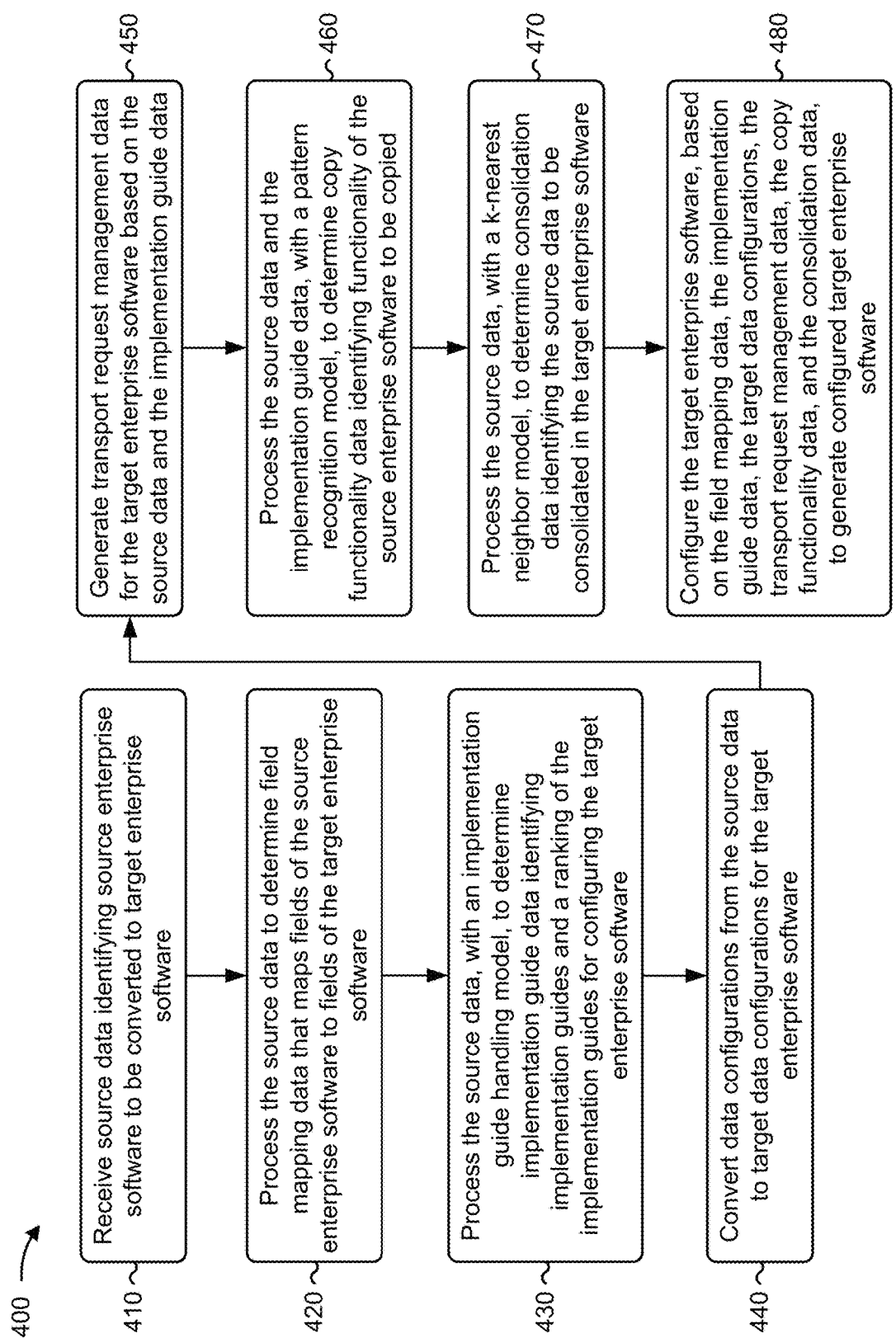
FIG. 4 is a flowchart of an example process for utilizing models for replacing existing enterprise software with new enterprise software.

FIG. 4 is a flowchart of an example process 400 for utilizing models for replacing existing enterprise software with new enterprise software. In some implementations, one or more process blocks of FIG. 4 may be performed by a device (e.g., configuration system 201). In some implementations, one or more process blocks of FIG. 4 may be performed by another device or a group of devices separate from or including the device, such as a server device (e.g., server device 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving source data identifying source enterprise software to be converted to target enterprise software (block 410). For example, the device may receive source data identifying source enterprise software to be converted to target enterprise software, as described above. The source enterprise software may include source enterprise resource planning software. The target enterprise software may include target enterprise resource planning software.

As further shown in FIG. 4, process 400 may include processing the source data to determine field mapping data that maps fields of the source enterprise software to fields of the target enterprise software (block 420). For example, the device may process the source data to determine field mapping data that maps fields of the source enterprise software to fields of the target enterprise software, as described above. In some implementations, the device may automatically determine a scope of a conversion from the source enterprise software to the target enterprise software. The device may process the source data to determine the field mapping based on the scope of the conversion.

As further shown in FIG. 4, process 400 may include processing the source data, with an IMG handling model, to determine IMG data identifying IMGs and a ranking of the IMGs for configuring the target enterprise software (block 430). For example, the device may process the source data, with an IMG handling model, to determine IMG data identifying IMGs and a ranking of the IMGs for configuring the target enterprise software, as described above.

In some implementations, when processing the source data, with the IMG handling model, to determine the IMG data, the device may process the source data, with a matrix factorization model, to determine the IMGs for configuring the target enterprise software. The device may map the IMGs into a mathematical representation. The device may process the mathematical representation, with a similarity function model, to determine the ranking of the IMGs.

As further shown in FIG. 4, process 400 may include converting data configurations from the source data to target data configurations for the target enterprise software (block 440). For example, the device may convert data configurations from the source data to target data configurations for the target enterprise software, as described above. The target data configurations may include data associated with a general ledger accounting component of the target enterprise software, an asset accounting component of the target enterprise software, an accounts payable component of the target enterprise software, and/or a material ledger component of the target enterprise software.

As further shown in FIG. 4, process 400 may include generating transport request management data for the target enterprise software based on the source data and the IMG data (block 450). For example, the device may generate transport request management data for the target enterprise software based on the source data and the IMG data, as described above.

In some implementations, when generating the transport request management data for the target enterprise software based on the source data and the IMG data, the device may identify first transport requests associated with a first portion of the IMGs of the IMG data. The device may create second transport requests for a second portion of the IMGs of the IMG data. The transport request management data may include the first transport requests and the second transport requests.

As further shown in FIG. 4, process 400 may include processing the source data and the IMG data, with a pattern recognition model, to determine copy functionality data identifying functionality of the source enterprise software to be copied (block 460). For example, the device may process the source data and the IMG data, with a pattern recognition model, to determine copy functionality data identifying functionality of the source enterprise software to be copied, as described above.

In some implementations, when processing the source data and the IMG data, with the pattern recognition model, to determine the copy functionality data, the device may identify patterns indicating that a particular IMG, for which reference data is created, is related to one or more of the IMGs. The device may automatically populate templates for the one or more IMGs with the reference data associated with the particular IMG. The reference data may correspond to the copy functionality data.

As further shown in FIG. 4, process 400 may include processing the source data, with a k-nearest neighbor model, to determine consolidation data identifying the source data to be consolidated in the target enterprise software (block 470). For example, the device may process the source data, with a k-nearest neighbor model, to determine consolidation data identifying the source data to be consolidated in the target enterprise software, as described above.

In some implementations, when processing the source data, with the k-nearest neighbor model, to determine the consolidation data, the device may compare the source data to identify redundant configurations from the source data. The device may remove the redundant configurations from the source data to generate the consolidated data.

As further shown in FIG. 4, process 400 may include configuring the target enterprise software, based on the field mapping data, the IMG data, the target data configurations, the transport request management data, the copy functionality data, and the consolidation data, to generate configured target enterprise software (block 480). For example, the device may configure the target enterprise software, based on the field mapping data, the IMG data, the target data configurations, the transport request management data, the copy functionality data, and the consolidation data, to generate configured target enterprise software, as described above.

In some implementations, the device may create filled templates based on the field mapping data, the IMG data, the target data configurations, the transport request management data, the copy functionality data, and the consolidation data. The device may execute the filled templates to generate the configured target enterprise software.

The device may cause the configured target enterprise software to be implemented in an enterprise system. The device may generate log files based on configuring the target enterprise software. The device may determine whether configuration of the target enterprise software failed or succeeded based on the log files. The device may cause the configured target enterprise software to be implemented in an enterprise system when the configuration of the target enterprise software succeeded. The device may update one or more of the field mapping data, the IMG data, the target data configurations, the transport request management data, the copy functionality data, and/or the consolidation data when the configuration of the target enterprise software failed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, source data identifying source enterprise software to be converted to target enterprise software;
   processing, by the device, the source data to determine field mapping data that maps fields of the source enterprise software to fields of the target enterprise software;
   processing, by the device, the source data, with an implementation guide handling model, to determine implementation guide data identifying implementation guides and a ranking of the implementation guides for configuring the target enterprise software;
   converting, by the device, data configurations from the source data to target data configurations for the target enterprise software;
   generating, by the device, transport request management data for the target enterprise software based on the source data and the implementation guide data;
   processing, by the device, the source data and the implementation guide data, with a pattern recognition model, to determine copy functionality data identifying functionality of the source enterprise software to be copied;
   processing, by the device, the source data, to determine consolidation data identifying the source data to be consolidated in the target enterprise software; and
   configuring, by the device, the target enterprise software, based on the field mapping data, the implementation guide data, the target data configurations, the transport request management data, the copy functionality data, and the consolidation data, to generate configured target enterprise software.

2. The method of claim 1, further comprising:
   automatically determining a scope of a conversion from the source enterprise software to the target enterprise software, and
   wherein processing the source data to determine the field mapping data comprises:
      processing the source data to determine the field mapping data based on the scope of the conversion.

3. The method of claim 1, further comprising:
   causing the configured target enterprise software to be implemented in an enterprise system.

4. The method of claim 1, wherein processing the source data, with the implementation guide handling model, to determine the implementation guide data comprises:
   processing the source data, with a matrix factorization model, to determine the implementation guides for configuring the target enterprise software;
   mapping the implementation guides into a mathematical representation; and
   processing the mathematical representation, with a similarity function model, to determine the ranking of the implementation guides.

5. The method of claim 1, wherein the target data configurations include data associated with one or more of:
   a general ledger accounting component of the target enterprise software,
   an asset accounting component of the target enterprise software,
   an accounts payable component of the target enterprise software, or
   a material ledger component of the target enterprise software.

6. The method of claim 1, wherein generating the transport request management data for the target enterprise software based on the source data and the implementation guide data comprises:
   identifying first transport requests associated with a first portion of the implementation guides of the implementation guide data; and
   creating second transport requests for a second portion of the implementation guides of the implementation guide data,
      wherein the transport request management data includes the first transport requests and the second transport requests.

7. The method of claim 1, wherein processing the source data and the implementation guide data, with the pattern recognition model, to determine the copy functionality data comprises:
   identifying patterns indicating that a particular implementation guide, for which reference data is created, is related to one or more of the implementation guides; and automatically populating templates for the one or more implementation guides with the reference data associated with the particular implementation guide,
wherein the reference data corresponds to the copy functionality data.

8. A device, comprising:
one or more memories; and
one or more processors, communicatively coupled to the one or more memories, configured to:
receive source data identifying source enterprise software to be converted to target enterprise software;
determine a scope of a conversion from the source enterprise software to the target enterprise software;
process the source data, based on the scope, to determine field mapping data that maps fields of the source enterprise software to fields of the target enterprise software;
process the source data, with an implementation guide handling model, to determine implementation guide data identifying implementation guides and a ranking of the implementation guides for configuring the target enterprise software;
convert data configurations from the source data to target data configurations for the target enterprise software;
generate transport request management data for the target enterprise software based on the source data and the implementation guide data;
process the source data and the implementation guide data, with a pattern recognition model, to determine copy functionality data identifying functionality of the source enterprise software to be copied;
process the source data, to determine consolidation data identifying the source data to be consolidated in the target enterprise software; and
configure the target enterprise software, based on the field mapping data, the implementation guide data, the target data configurations, the transport request management data, the copy functionality data, and the consolidation data, to generate configured target enterprise software.

9. The device of claim 8, wherein the one or more processors, when processing the source data, to determine the consolidation data, are configured to:
compare the source data to identify redundant configurations from the source data; and
remove the redundant configurations from the source data to generate the consolidated data.

10. The device of claim 8, wherein the source enterprise software includes source enterprise resource planning software, and the target enterprise software includes target enterprise resource planning software.

11. The device of claim 8, wherein the one or more processors are further configured to:
create filled templates based on the field mapping data, the implementation guide data, the target data configurations, the transport request management data, the copy functionality data, and the consolidation data; and
execute the filled templates to generate the configured target enterprise software.

12. The device of claim 8, wherein the one or more processors are further configured to:
generate log files based on configuring the target enterprise software;
determine whether a configuration, of the target enterprise software and associated with one or more target data configurations of the target data configurations, failed or succeeded based on the log files; and
cause the configured target enterprise software to be implemented in an enterprise system when the configuration of the target enterprise software succeeded.

13. The device of claim 12, wherein the one or more processors are further configured to:
update one or more of the field mapping data, the implementation guide data, the target data configurations, the transport request management data, the copy functionality data, or the consolidation data when the configuration of the target enterprise software failed.

14. The device of claim 8, wherein the one or more processors are further configured to:
create filled templates based on the field mapping data, the implementation guide data, the target data configurations, the transport request management data, the copy functionality data, and the consolidation data;
execute the filled templates to generate the configured target enterprise software;
generate log files based on executing the filled templates to generate the configured target enterprise software;
determine whether a configuration, of the target enterprise software and associated with the target data configurations, failed or succeeded based on the log files;
cause the configured target enterprise software to be implemented in an enterprise system when the configuration of the target enterprise software succeeded; and
update the filled templates when the configuration of the target enterprise software failed.

15. A non-transitory computer-readable medium storing a set of instructions, the set of instructions comprising:
one or more instructions that, when executed by one or more processors of a device, cause the device to:
receive source data identifying source enterprise software to be converted to target enterprise software;
process the source data to determine field mapping data that maps fields of the source enterprise software to fields of the target enterprise software;
process the source data, with an implementation guide handling model, to determine implementation guide data identifying implementation guides and a ranking of the implementation guides for configuring the target enterprise software;
convert data configurations from the source data to target data configurations for the target enterprise software;
generate transport request management data for the target enterprise software based on the source data and the implementation guide data;
process the source data and the implementation guide data, with a pattern recognition model, to determine copy functionality data identifying functionality of the source enterprise software to be copied;
process the source data, to determine consolidation data identifying the source data to be consolidated in the target enterprise software;
configure the target enterprise software, based on the field mapping data, the implementation guide data, the target data configurations, the transport request management data, the copy functionality data, and the consolidation data, to generate configured target enterprise software; and
cause the configured target enterprise software to be implemented in an enterprise system.

16. The non-transitory computer-readable medium of claim 15, wherein the one or more instructions, that cause the device to process the source data, with the implementation guide handling model data, to determine the implementation guide data, cause the device to:
- process the source data, with a matrix factorization model, to determine the implementation guides for configuring the target enterprise software;
- map the implementation guides into a mathematical representation; and
- process the mathematical representation, with a similarity function model, to determine the ranking of the implementation guides.

17. The non-transitory computer-readable medium of claim 15, wherein the one or more instructions, that cause the device to generate the transport request management data for the target enterprise software based on the source data and the implementation guide data, cause the device to:
- identify first transport requests associated with a first portion of the implementation guides of the implementation guide data; and
- create second transport requests for a second portion of the implementation guides of the implementation guide data,
  - wherein the transport request management data includes the first transport requests and the second transport requests.

18. The non-transitory computer-readable medium of claim 15, wherein the one or more instructions, that cause the device to process the source data and the implementation guide data, with the pattern recognition model, to determine the copy functionality data, cause the device to:
- identify patterns indicating that a particular implementation guide, for which reference data is created, is related to one or more of the implementation guides; and
- automatically populate templates for the one or more of the implementation guides with the reference data associated with the particular implementation guide,
  - wherein the reference data corresponds to the copy functionality data.

19. The non-transitory computer-readable medium of claim 15, wherein the one or more instructions, that cause the device to process the source data to determine the consolidation data, cause the device to:
- compare the source data to identify redundant configurations from the source data; and
- remove the redundant configurations from the source data to generate the consolidated data.

20. The non-transitory computer-readable medium of claim 15, wherein the one or more instructions, that cause the device to configure the target enterprise software, based on the field mapping data, the implementation guide data, the target data configurations, the transport request management data, the copy functionality data, and the consolidation data, to generate the configured target enterprise software, cause the device to:
- create filled templates based on the field mapping data, the implementation guide data, the target data configurations, the transport request management data, the copy functionality data, and the consolidation data; and
- execute the filled templates to generate the configured target enterprise software.

* * * * *